United States Patent Office 3,560,473
Patented Feb. 2, 1971

---

3,560,473
PROCESS FOR POLYMERIZING ISOPRENE
Augusto Bonfardeci and Lido Porri, Milan, Italy, assignors to Montecatini Edison S.p.A., Milan, Italy
No Drawing. Filed Sept. 18, 1968, Ser. No. 760,729
Claims priority, application Italy, Sept. 19, 1967,
20,610/67
Int. Cl. C08d 3/10
U.S. Cl. 260—94.3      8 Claims

ABSTRACT OF THE DISCLOSURE

Isoprene is polymerized to high molecular weight polyisoprene having substantially cis-1,4 structure practically identical with that of natural rubber, using ternary catalytic systems prepared from titanium tetra-alkoxides, organometallic compounds of aluminum, and a silicon compound.

THE PRIOR ART

It is known that polyisoprene having cis-1,4 structure can be obtained by poymerizing the monomer in contact with $TiCl_4/AlR_3$ catalyst system (R being alkyl or aryl), in a hydrocarbon solvent. Although the structure of the polymers obtained is similar to that of natural rubber, those polymers differ from natural rubber in regard to some characteristics, mainly in having a lower content of cis-1,4 units.

It is also known that the elastomeric properties of a polyisoprene are in general much better the higher the content of cis-1,4 units and the lower the content of 3,4 units.

Many attempts have been made to obtain a polyisoprene having a content of cis-1,4 units as close as possible to 100%. Such attempts have so far been successful using the catalytic systems prepared from titanium tetrachloride and aluminum alkyls only by suitably modifying the conditions under which the catalysts are prepared. Even so, those catalyst systems have the disadvantage that the use of aluminum trialkyls involves operating difficulties due to the ready inflammability thereof.

Various attempts have been made, therefore, to avoid the problems incident to the use of the aluminum trialkyls by replacing the latter with partially halogenated aluminum alkyls which are more stable and less dangerous and, in addition, have the advantage of being less costly than the aluminum trialkyls.

However, the attempts made to polymerize isoprene to high cis-1,4 polyisoprene by means of catalyst systems based on aluminum alkylhalides have not so far been successful. For instance, it is known that catalysts prepared from aluminum alkylhalides and titanium tetra-alcoholates polymerize isoprene to polyisoprene which, while having prevailingly cis-1,4 structure, has cis-1,4 content which is considerably lower than that of natural rubber. More particularly, using catalysts prepared from titanium tetraalcoholates and aluminum sesquichloride, relatively low conversions of isoprene to polymer are achieved, and in the polyisoprene obtained the proportion of double bonds having cis-1,4 enchainment is below 90%.

THE PRESENT INVENTION

According to the present invention, high molecular weight polyisoprene having substantially cis-1,4 structure practically identical with that of natural rubber is obtained by polymerizing isoprene in contact with a ternary catalytic system prepared from:

(a) A titanium compound corresponding to the general formula $$Ti(OR)_4$$

wherein R is a linear or branched alkyl group containing from 1 to 18, preferably from 1 to 8 carbon atoms;

(b) An organometallic compound of aluminum corresponding to the general formula $$Al_2R_3Cl_3$$

wherein R is a linear or branched alkyl group containing from 1 to 6 carbon atoms; and (c) A silicon compound corresponding to the general formula $$SiH_aR_b(OR')_c$$

wherein R and R' are linear or branched alkyl radicals containing from 1 to 16, preferably from 2 to 6 carbon atoms;

$a = 0,1,2,3$
$b = 0,1,2,3$
$c = 0,1,2,3$, or 4, the sum of $a+b+c$ being equal to 4.

Illustrative silicon compounds which can be used as one component of the catalyst employed in the process of this invention include $(CH_3)_3SiOC_2H_5$
$(C_2H_5)_3SiH$
$Si(OC_2H_5)_4$
$(C_2H_5)_3SiOC_2H_5$
$(C_2H_5)_2HSiOC_2H_5$
$(C_4H_9)_3SiOC_2H_5$, etc.

It is to be understood that in the organometallic compound of aluminum represented by the formula $Al_2R_3Cl_3$, corresponding to that of a so-called aluminum alkyl sesquichloride, the molar quantities of the alkyl groups and of the halogen atoms are about equal.

The ternary catalytic system used in the practice of the present invention can be prepared conveniently by introducing the three catalytic components, in any desired order, into a suitable reaction vessel kept in a nitrogen atmosphere and containing a diluent of the type specified hereinbelow.

It may be desirable to age the catalyst formed, before bringing it into contact with the isoprene to be polymerized. The aging can be effected by heating the catalyst up to, for instance, about 50° C., for about 15 minutes. After such aging, the catalyst is contacted with the isoprene monomer, and the polymerization is started.

Although it is possible to operate with very small quantities of diluent during the catalyst preparation, it is preferable to use larger amount of diluent during the polymerization, in order to more easily remove the reaction heat and to control the reaction speed.

The useful diluents for both the catalyst preparation and the polymerization are, preferably, aliphatic, cycloaliphatic and aromatic hydrocarbons, halogenated if required, or mixtures thereof. The volumetric ratio between the diluent and isoprene is preferably from 1:1 to 10:1.

The molar ratio between the aluminum compound and the titanium compound may be in the range 20:1 to 1:1, but is preferably from 10:1 to 6:1.

The molar ratio between the silicon compound and the titanium compound is generally in the range 10:1 and 1:1, but is preferably in the range 4:1 to 2:1.

The polymerization can be carried out at temperatures from —30° C. to +50° C.

Depending on the particular polymerization conditions selected, the total conversion of isoprene may be obtained in a time varying from some minutes to some days. It is preferred, in order to make best use of the polymerization reactors and recover the polymer more easily from the reaction mass, to interrupt the polymerization when conversion of the monomer has reached 30% to 70%, recover the monomer and the polymer formed, and recycle the unconverted monomer.

The polyisoprene obtained by the process of this invention gives a nuclear magnetic resonance (NMR) spectrum which is practically identical with the spectrum for natural rubber. From this spectrum, it appears that the amount of 3,4 and 1,4-trans groups in the polymer is not greater than 3% and that 1,2 units are absent, so that the content of cis-1,4 units is generally at least 97–98%.

A comparison of the NMR spectrum of the polyisoprenes obtained by the present process, with the spectrum of polyisoprene obtained using $TiCl_4$/Al trialkyl catalyst systems, shows that the latter polymers have a content of units different from cis-1,4 (i.e., 1,4-trans and 3,4) which is higher than the content of such groups in the polymers produced according to this invention.

Furthermore, the cis-1,4 polyisoprene obtained according to this invention is substantially gel-free.

The polyisoprene may be vulcanized by methods used conventionally for the vulcanization of highly unsaturated elastomers, in particular by means of recipes based on sulphur and accelerators and yield elastomers having mechanical and dynamic properties practically equal to those of natural rubber vulcanized with the aid of the same recipes.

Also, the polyisoprene can be dispersed in aqueous media to form latexes having properties practically identical with those of natural rubber.

These polyisoprenes have a high average molecular weight, as is evident from the fact that the intrinsic viscosity of solutions thereof in toluene at 30° C. is generally higher than 2 dl./g.

The results we obtain by polymerizing isoprene in contact with the ternary catalyst systems described herein can be regarded as surprising since when diethyl aluminum monochloride is used in the ternary system, instead of aluminum sesquichloride, only about 90% of the units making up the obtained polyisoprene have cis-1,4 configuration and the polymer has a high gel content; furthermore, much lower conversions are obtained.

The results are equally poor if aluminum sesquichloride is used as one catalyst-forming component but the silicon compound is omitted.

The following examples are given to illustrate the invention, without however limiting its scope.

Example 1

Operating under a dry nitrogen atmosphere, there were introduced into a 100 cc. vessel provided with a mechanical stirrer and nitrogen inlet tube:

30 cc. n-heptane
0.15 cc. $Ti(O-n-C_4H_9)_4$
0.42 cc. $Al_2Et_3Cl_3$

This operation was carried out at 50° C.; the whole was then kept under stirring for 15 minutes, whereupon 0.20 cc. of $(CH_3)_3SiOC_2H_5$ were added. Stirring was continued for another 5 minutes and the whole was then allowed to cool down to room temperature.

Thereupon isoprene (20 cc.) was added and the whole was left to polymerize. After 6 minutes the polymerization mixture was poured into methanol thereby obtaining 4.4 g. of polymer (conversion 31%) having a content of 1,4 cis units of not less than 97%. The gel content was very low (2%). The intrinsic viscosity in toluene at 30° C. was 2.6 dl./g. By operating as indicated above, but by using as a solvent, instead of n-heptane, the same volume of pentane or cyclohexane, the same results were achieved.

Example 2

Into a vessel as described in Example 1, there were introduced:

40 cc. n-heptane
0.15 cc. $Ti(O-n-C_4H_9)_4$
0.42 cc. $Al_2Et_3Cl_3$

The temperature was held at 50° C., and the mixture was kept under stirring for 15 minutes, after which 0.15 cc. of $(CH_3)_3SiOC_2H_5$ were added. After this addition, stirring was carried on for another 5 minutes, when the mass was allowed to cool down to room temperature. Thereupon, 10 cc. of isoprene were introduced and the mass was left to polymerize, maintaining the temperature between 15° and 20° C. After 2 hours the polymerization mixture was poured into methanol, thereby obtaining 3.9 g. of polymer (conversion 56%) having a 1,4 cis units content not lower than 98%. The gel content was very low (about 1%). The intrinsic viscosity in toluene at 30° C. was 2.4 dl./g.

By conducting the polymerization as indicated above, but in the absence of the silicon compound, there were obtained 2.2 g. of polymer (conversion 31%) with a 1,4 cis units content below 90%.

The gel content was, in this case, relatively high (about 20%).

Example 3

Into a vessel as described in Example 1, there were introduced:

40 cc. n-heptane
0.15 cc. $Ti(O-n-C_4H_9)_4$
0.42 cc. $Al_2Et_3Cl_3$

The temperature was held at 50° C., and the mixture was kept under stirring for 15 minutes, after which 0.20 cc. of $Et_3SiH$ were added.

After this addition, stirring was continued for 5 minutes, the whole mass being then left to cool down to room temperature. Thereupon, 10 cc. of isoprene were introduced and polymerization was allowed to proceed.

After 2 hours, the polymerization mixture was poured into methanol, thereby obtaining 2.9 g. of polymer (conversion 40%) with a content of 1,4 cis units not lower than 97%. The intrinsic viscosity in toluene at 30° C. was 2.7 dl./g.

By operating as indicated above, but by using as a solvent, instead of n-heptane, an equal volume of benzene, a polymer was obtained showing the same properties.

Examples 4–6

Examples 1, 2 and 3, respectively, were repeated, but using $Ti(O-i-C_4H_9)_4$ as the titanium compound instead of $Ti(O-n-C_4H_9)_4$. The results obtained were completely equal to those of the corresponding examples carried out with the ternary catalyst prepared from $Ti(O-n-C_4H_9)_4$.

Example 7

Example 1 was repeated, using as silicon compound, instead of triethylmonoethoxysilicon, silicon tetraethylate, while maintaining the same molar ratios. The results obtained were practically identical with those of Example 1.

It will be understood that, in practicing the invention, changes in details may be made without departing from the spirit of the invention. Therefore, we intend to include in the scope of the appended claims, all variations and modifications that will be obvious to those skilled in the art from the description and illustrative working examples given herein.

What we claim is:

1. A process for preparing high molecular weight polyisoprene having substantially cis-, 4 structure, characterized in that isoprene is polymerized in contact with a catalyst prepared from the following three components:
  (a) titanium compounds having the general formula $Ti(OR)_4$ in which R is selected from the group consisting of linear and branched alkyl radicals containing from 1 to 18 carbon atoms;
  (b) organometallic compounds of aluminum having the general formula $Al_2R_3Cl_3$, in which R is selected from the group consisting of linear and branched alkyl radicals containing from 1 to 6 carbons atoms; and
  (c) from about 1% to about 2% by weight, based on the isoprene weight, of a silicon compound having the general formula $SiH_aR_b(OR')_c$, in which R and R' are selected from the group consisting of linear and branched alkyl radicals containing from 1 to 16 carbon atoms, $a$ and $b$ are selected from the group consisting of zero and integers from 1 to 3; $c$ is selected from the group consisting of zero and integers from 1 to 4; and the sum of $a+b+c$ is equal to 4; the molar ratio between the aluminum compound and the titanium compound being from 20:1 to 1:1, and the molar ratio between the silicon compound and the titanium compound being from 10:1 to 1:1.

2. The process according to claim 1, characterized in that the catalyst used is prepared from three components as follows:
  (a) titanium compounds having the general formula $Ti(OR)_4$ in which R is selected from the group consisting of linear and branched alkyl radicals containing from 1 to 8 carbon atoms;
  (b) organometallic compounds of aluminum having the general formula $Al_2R_3Cl_3$, in which R is selected from the group consisting of linear and branched alkyl radicals containing from 1 to 6 carbon atoms; and
  (c) silicon compounds having the general formula $SiH_aR_b(OR')_c$, wherein R and R' are selected from the group consisting of linear and branched radicals containing 2 to 6 carbon atoms.

3. The process according to claim 1, further characterized in that the molar ratio between the aluminum compound and the titanium compound is from 10:1 to 6:1.

4. The process according to claim 1, further characterized in that the molar ratio between the silicon compound and the titanium compound is from 4:1 to 2:1.

5. The process according to claim 1, characterized in that the polymerization is carried out at a temperature of from $-30°$ C. to $+80°$ C.

6. The process according to claim 5, further characterized in that the polymerization is carried out at a temperature of from $0°$ C. to $+50°$ C.

7. The process according to claim 1, characterized in that the isoprene polymerization is carried out in a diluent selected from the group consisting of aliphatic, cycloaliphatic and aromatic hydrocarbon solvents and their halogenated derivatives.

8. The process according to claim 7, further characterized in that the volume ratio between the diluent and the isoprene is from 1:1 to 10:1.

References Cited

UNITED STATES PATENTS

| | | | |
|---|---|---|---|
| 2,977,349 | 3/1961 | Brockway et al. | 260—94.3 |
| 3,404,139 | 10/1968 | Fukumoto et al. | 260—93.7 |

FOREIGN PATENTS

| | | | |
|---|---|---|---|
| 1,016,512 | 1/1966 | Great Britain | 260—94.9 |

OTHER REFERENCES

Rochow: "Chemistry of the Silicones," 1951, pp. 56–57 (relied on) John Wiley & Sons, New York, N.Y.

JOSEPH L. SCHOFER, Primary Examiner

R. A. GAITHER, Assistant Examiner

UNITED STATES PATENT OFFICE
CERTIFICATE OF CORRECTION

Patent No. 3,560,473             Dated February 2, 1971

Inventor(s) Augusto Bonfardeci and Lido Porri

It is certified that error appears in the above-identified patent and that said Letters Patent are hereby corrected as shown below:

Col. 1, line 24, "a" is missing after "with".

Col. 4, last line, "cis-, 4 structure should read - - -cis-1, 4 structu

Signed and sealed this 24th day of December 1974.

(SEAL)
Attest:

McCOY M. GIBSON JR.            C. MARSHALL DANN
Attesting Officer              Commissioner of Patents